US006351552B1

(12) United States Patent
Weaver et al.

(10) Patent No.: US 6,351,552 B1
(45) Date of Patent: Feb. 26, 2002

(54) PREDESTRUCTION NOTE IMAGE AUDIT

(75) Inventors: William A. V. Weaver, Memphis, TN (US); Richard G. Haycock, Corblham (GB); James Bowie Lindenblatt, Irving, TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/521,837

(22) Filed: Mar. 9, 2000

(51) Int. Cl.$^{7}$ .................................................. G06K 9/00

(52) U.S. Cl. ....................................................... 382/135

(58) Field of Search ................................ 382/135, 137, 382/140, 312, 323; 209/576, 583; 902/8, 14, 15, 17

(56) References Cited

U.S. PATENT DOCUMENTS

| | | | | |
|---|---|---|---|---|
| 3,782,543 A | | 1/1974 | Martelli et al. | 209/75 |
| 3,916,194 A | | 10/1975 | Novak et al. | 250/338 |
| 3,932,272 A | | 1/1976 | Carnes, Jr. et al. | 209/73 |
| 4,264,808 A | | 4/1981 | Owens et al. | 235/379 |
| 4,346,851 A | | 8/1982 | Bernardi et al. | 241/159 |
| 4,587,434 A | | 5/1986 | Roes et al. | 250/556 |
| 4,611,345 A | * | 9/1986 | Ohnishi et al. | 382/7 |
| 4,905,839 A | | 3/1990 | Yuge et al. | 209/534 |
| 4,905,840 A | | 3/1990 | Yuge et al. | 209/534 |
| 4,991,008 A | | 2/1991 | Nama | 358/108 |
| 5,039,020 A | | 8/1991 | Leuthold et al. | 241/30 |
| 5,099,423 A | | 3/1992 | Graef et al. | 364/406 |
| 5,325,952 A | | 7/1994 | McGinley et al. | 194/203 |
| 5,478,992 A | | 12/1995 | Hamada et al. | 235/379 |
| 5,545,885 A | | 8/1996 | Jagielinski | 235/449 |
| 5,692,067 A | | 11/1997 | Raterman et al. | 382/135 |
| 5,982,918 A | * | 11/1999 | Mennie et al. | 382/135 |

* cited by examiner

*Primary Examiner*—Andrew W. Johns
(74) *Attorney, Agent, or Firm*—Carstens, Yee & Cahoon; Colin P. Cahoon

(57) ABSTRACT

Apparatus and methods for identifying a note that has been destroyed or dispensed. The apparatus and methods determine and record the image of the note just prior to or as the note is being engaged by shredding tines or a note feeder. The apparatus can be used in conjunction with an OCR system such that the serial code of each note destroyed or dispensed is determined automatically by the OCR system.

47 Claims, 6 Drawing Sheets

PREDESTRUCTION NOTE IMAGE AUDIT

BACKGROUND OF THE INVENTION

1. Technical Field

The present invention relates to methods for identifying a currency note by imaging the entire note just prior to destruction of or dispensing the note. The imaging takes place as close to the destruction or dispensing device as possible. The notes serial code or other identifying feature can then be read from the stored image.

2. Description of Related Art

Optical character recognition ("OCR") is a technology commonly used in the currency processing field for lifting the serial code or code from processed notes. OCR technology is used, for example, for identifying specific notes processed by a high speed currency processing machine, such as those machines manufactured and marketed by Currency Systems International of Irving, Tex., by lifting a note's serial code using a camera device and then recording the serial code to the note processed.

By way of example, a stack of currency can be fed into the high speed currency processing machine. As one of the functions of the machine, an OCR device reads the serial code or code of notes passed through the machine for processing. These serial codes can be recorded and identified to specific notes as they are processed. One of the functions of the high speed currency processor may be to sort currency by denomination and stack fit notes for bundling. As the fit notes are stacked, the data processing capabilities of the currency processing machine track the location in the stack of each currency note by serial code. For example, for a processed stack or bundle of one hundred notes in twenty dollar denominations, data is accumulated that will indicate the specific serial code on each note in the stack or bundle and position of each note in the stack.

This information can be particularly useful in a number of potential applications. For example, heavily soiled or torn notes are periodically taken out of circulation. An OCR device reads the serial code for each note that is to be destroyed. The serial code of each of these notes is then recorded and stored for later reference. The notes are then taken from the area where they are scanned to a shredding machine where they are destroyed. The purpose of recording the serial code of the destroyed notes is to have a record of which notes have been destroyed and therefore, taken out of circulation. However, since the notes are often scanned by the OCR device several feet away from the shredding machine, there is the potential for notes to be scanned as being destroyed that are not actually destroyed because those notes failed to make it into the shredding machine. Some examples of reasons for some notes not making it into the shredding machine after being scanned by the OCR device include accidental mistakes and intentional takings of these notes. Furthermore, OCR devices have several inherent shortcomings. For instance, there may be occasions when not all characters of a note's serial code may be readable by an OCR device. Additionally, there may be parts of a note that are obscured due to soiling or other condition of the note, thus making it impossible for an OCR device to accurately determine the note's serial code.

Another problem with destroying currency notes that are too worn out or soiled to put back into circulation is that every note identified as a note that needs to be destroyed must be shipped to a central bank or governmental entity, which controls the currency, for destruction. These institutions must verify that notes tagged for destruction are actually destroyed. However, if these entities allowed individual banks to destroy notes, there is currently no feasible method to ensure that the notes were actually destroyed rather than removed since there are typically no remnants from the destroyed notes that can be identified systematically to determine which notes have been destroyed.

As an example of the inadequacies of current currency audits and OCR technology outside the sphere of note destruction, consider the dispensing of currency to account holders via an automatic teller machine (ATM). Currently, no accurate method of determining which notes from a stack of notes, of which the serial codes or other identifying information is known, have been dispensed to an account holder. Such information is useful in verifying that an account holder did indeed receive a certain sum of cash from the ATM and to verify that thieves have not stolen money from the machine. Such information is also useful in determining which notes by serial number or code have been removed from the system without authorization. However, even utilizing OCR technology does not provide sufficient accuracy and reliability to gather this type of information. This is because an OCR scan is not always able to read the entire serial code from a currency note, thus making it difficult if not impossible to identify with certainty the notes dispensed to specific accounts.

Consequently, a need exists for a method that will accurately identify whether or not a note has actually been destroyed or dispensed. This method should provide positive note identification and an image of notes that have actually been destroyed or dispensed. Such a method should reduce the possibility of incorrectly identifying notes as having been destroyed or dispensed when in fact they have not been.

SUMMARY OF INVENTION

The invention involves apparatus and methods for identifying currency notes that have been destroyed or dispensed. This is accomplished by capturing an image of a note immediately prior to the note entering the shredding tines of a shredding machine or the output of an ATM using a camera or other image capturing device. The image is then stored in a database and optical character recognition (OCR) software is used to determine the serial code or other distinguishing feature of the destroyed or dispensed note. Furthermore, assuming that the note is too heavily soiled or damaged for the OCR to determine the serial code of the note, an image of the note can also be stored and displayed to a user at a later time. Thereby, the identity of the notes whose serial code cannot be determined by the OCR software can be determined by other means. By scanning the notes just as prior to their destruction, an accurate database of destroyed notes may be maintained. Likewise, by scanning the notes just prior to dispensing them from an ATM, an accurate database of dispensed notes may be maintained, thus allowing comparison of dispensed notes to notes placed within the ATM for accurate accounting and auditing. Furthermore, if the serial codes of notes that need to be destroyed, based on age, soiled condition, or some other factor, is known before the notes are sent for shredding, then an accurate determination of how many and which of these notes have actually been destroyed and which notes may have been taken by a thief can be made. The invention increases security by decreasing the likelihood that a note may be recorded as having been destroyed when, in actuality, it has been removed from the note destruction machine prior to destruction. The invention increases accurate accounting of which notes have been destroyed.

Furthermore, the recipient of the images may be a central bank and the present invention provides added security for the central bank if and when they allow a commercial bank to destroy currency notes.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as preferred mode of use, further objectives and advantages thereof, will be best understood by reference to the following detailed description of illustrative embodiments when read in conjunction with the accompanying drawings, wherein:

DETAILED DESCRIPTION

Figure 1A:
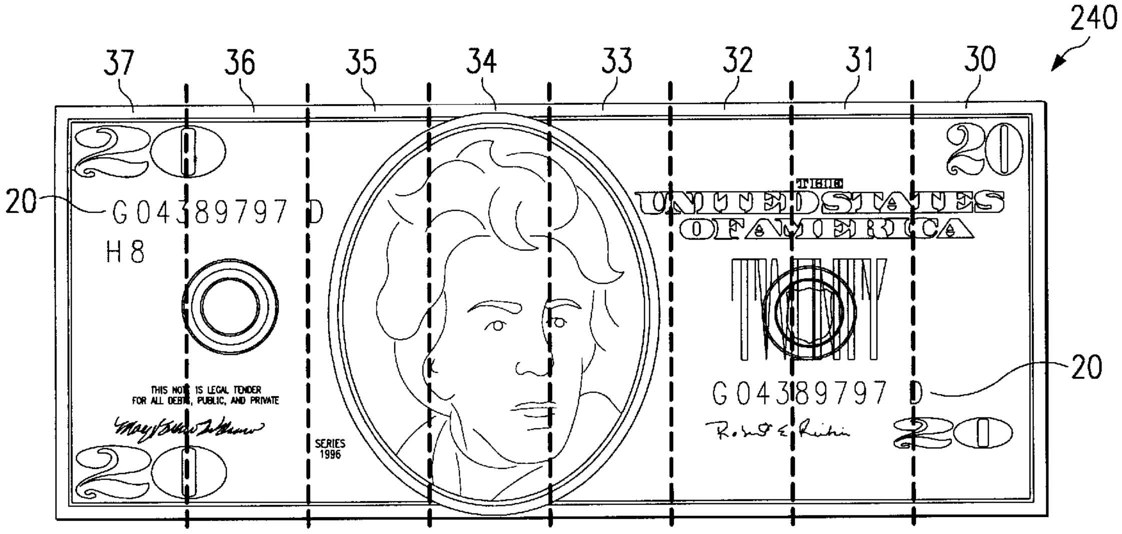
FIGS. 1A–1C are illustrations of notes.

FIG. 1A illustrates a typical twenty dollar bill or note. FIG. 1A shows identical serial codes 20 located in the upper left and lower right hand corners of the note. This code 20 can consist of combinations of numbers and/or letters.

Figure 2:
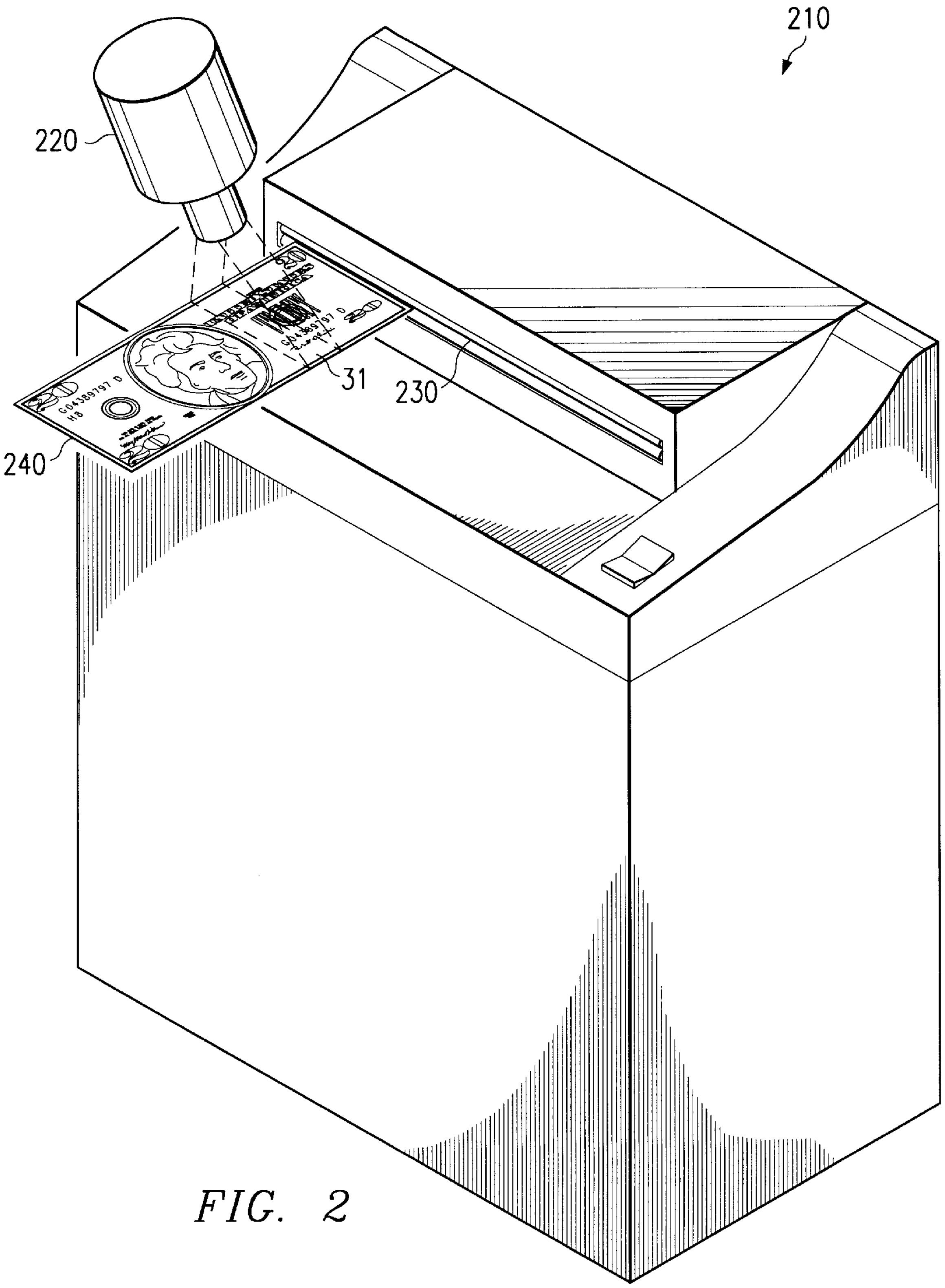
FIG. 2 depict a schematic diagram of a pre-destruction image audit and shredding apparatus.

With reference now to FIG. 2, there is shown a schematic diagram illustrating a shredding machine 210 in combination with a camera 220. The shredding machine 210 includes tines 230 for shredding notes fed into the machine and motors and machinery (not shown) for pulling notes into the shredding machine 210. The shredding machine 210 may also include a receptacle (also not shown) for collecting the shredded bits of the destroyed notes. It should be noted, that FIG. 2 is not drawn to scale and that, in order to aid in illustrating the invention, the camera 220 is shown capturing the image of the note 240 at a point much further from the tines 230 than would be preferable in practice.

The camera 220 is located such that it captures the image of a note 240 immediately before the note 240 is shredded by the shredding machine 210. In a preferred embodiment, the camera 220 is a line-scanning camera. The camera 220 sequentially captures the images of small rectangular sections 30–37 of the note 240, as illustrated in FIG. 1A, at a location immediately before each section of the note 240 enters the tines 230 of the shredding machine 210. Thus, the image of the first rectangular section 30 of the note 240 is captured by the camera 220. Next, as the first rectangular section 30 of the note 240 is being shredded by the tines 230 of the shredding machine 210, the image of the next rectangular section 31 of the note 240 is captured by the camera 220. The process continues until the image of each section of the note 240 has been captured by the camera 220 and the note 240 is completely shredded. The image of each note is the composite the images of all of the rectangular sections of the note 240. In this manner, the image of each note that is destroyed is captured. Thus, by positioning the camera in this manner, it assures that the image is not captured until just prior to destruction of the note, therefore making it impossible to remove the note after imaging but prior to destruction ensuring that only the images of destroyed notes are captured.

Figure 1B:
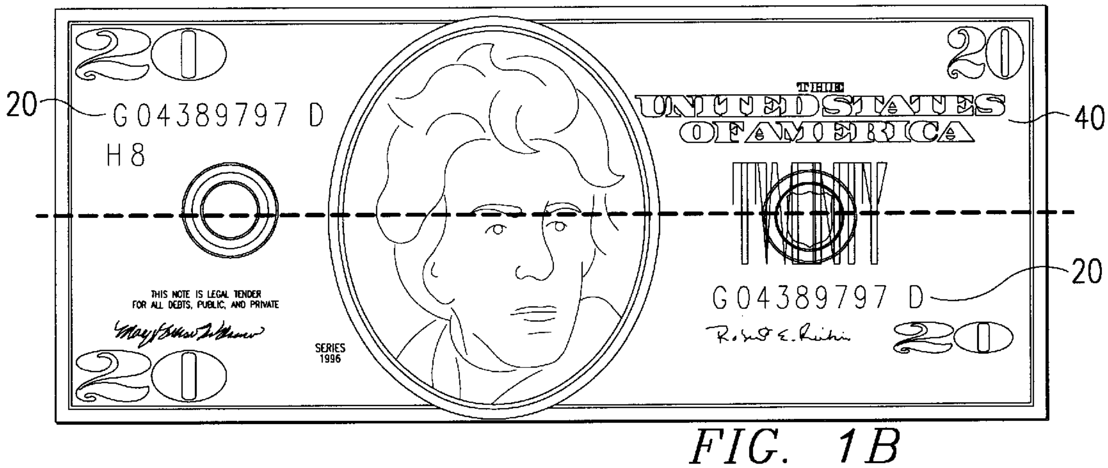
Figure 1C:
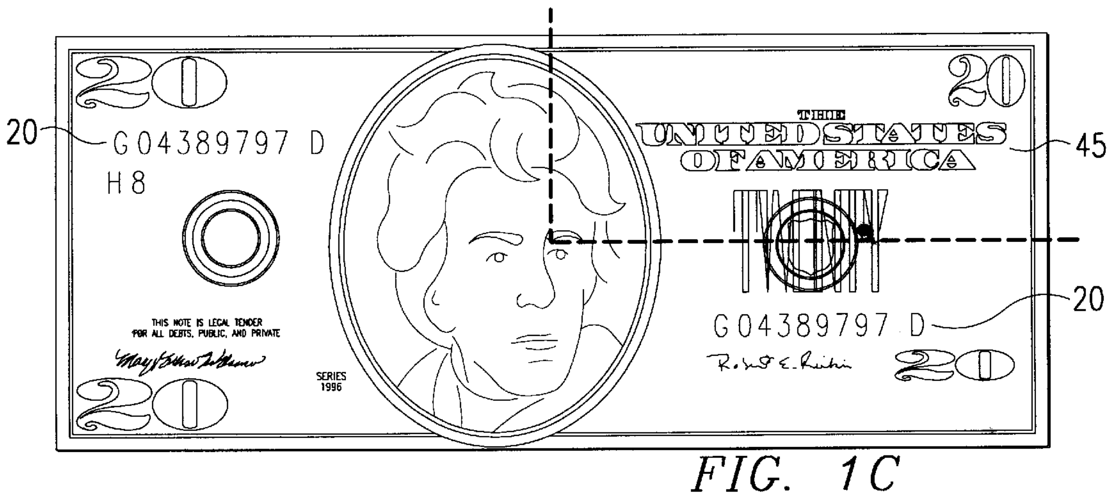

Alternatively, rather than capturing the image of the entire note, only portions of the note are imaged. If available space in which to store the data from imaging the note is a concern, the amount of data to be stored can be reduced by capturing the image of only some portion of the note. In one example, the image of only an upper one half 40 of the note as illustrated in FIG. 1B is captured and stored. In another example, the image of an upper right quadrant 45 of the note as illustrated in FIG. IC is captured and stored. However, if only a portion of the note is imaged and/or stored, it must be ensured that the portion imaged and/or stored is sufficiently large to capture the unique identifying information, such as a serial code, from each note, thus ensuring that each note may be differentiated from every other note.

It should be noted, that as depicted in FIG. 1A, the rectangular sections 30–37 are rather large in comparison to the note. However, this is so merely for illustration purposes. In actuality, the size of the rectangles will be more closely akin to a line than is depicted and many more rectangles will be needed to image an entire note than the seven depicted in FIG. 1A.

The images of the shredded notes are stored in a database. In one embodiment, optical character recognition (OCR) software or/and barcoding software running on a data processing system determines the code 20 of each note that is destroyed. The data processing system used to run the OCR software may be a personal computer. If the OCR software is unable to determine the serial code of a note from the captured image, the image of the particular note may be displayed to a user to allow that user to manually enter the serial code based on the image observed on the display. Thus, a database is created containing a list of serial codes for each note that has been destroyed. If necessary for archive purposes, the image files and database of serial codes may be committed to compact disk read only memory (CD-ROM) or to Digital Versatile Disk (also known as Digital Video Disk) Read Only Memory (DVD-ROM) or other storage devices. Additionally, the images and/or serial codes or other identifying features of the notes destroyed may be transmitted, in real time, to a central bank or government authority, thus allowing the central bank or government authority the ability to monitor and verify the identities of notes destroyed. Thus, the necessity of sending notes that need to be destroyed to the central bank or government authority is eliminated since the real time auditing provided to the central bank or government authority provides the central bank or government authority with the confidence needed to allow decentralized note destruction.

Figure 3:
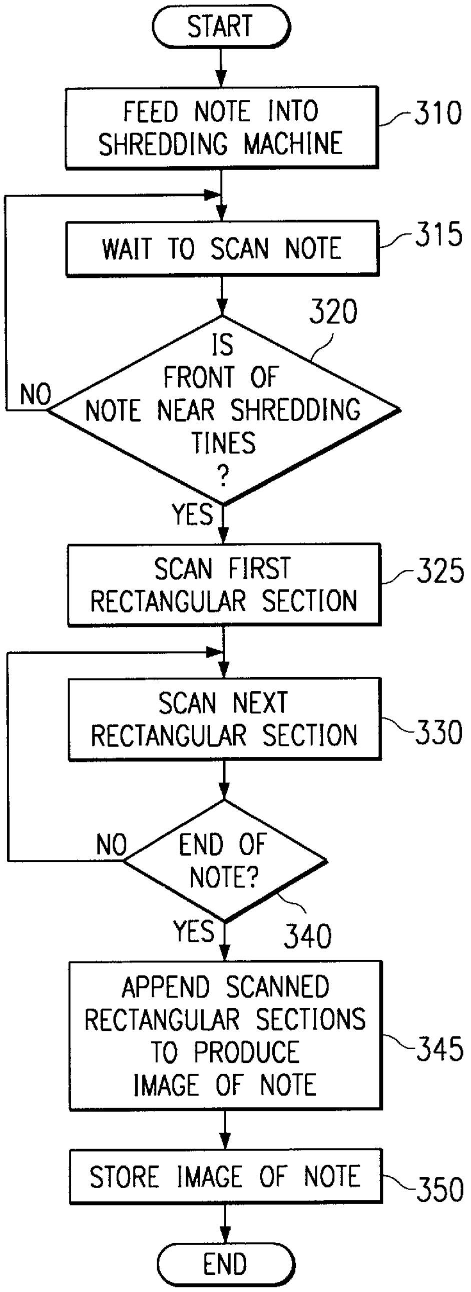
FIG. 3 depicts a flowchart illustrating a preferred method for capturing and storing an image of a note.
Figure 4:
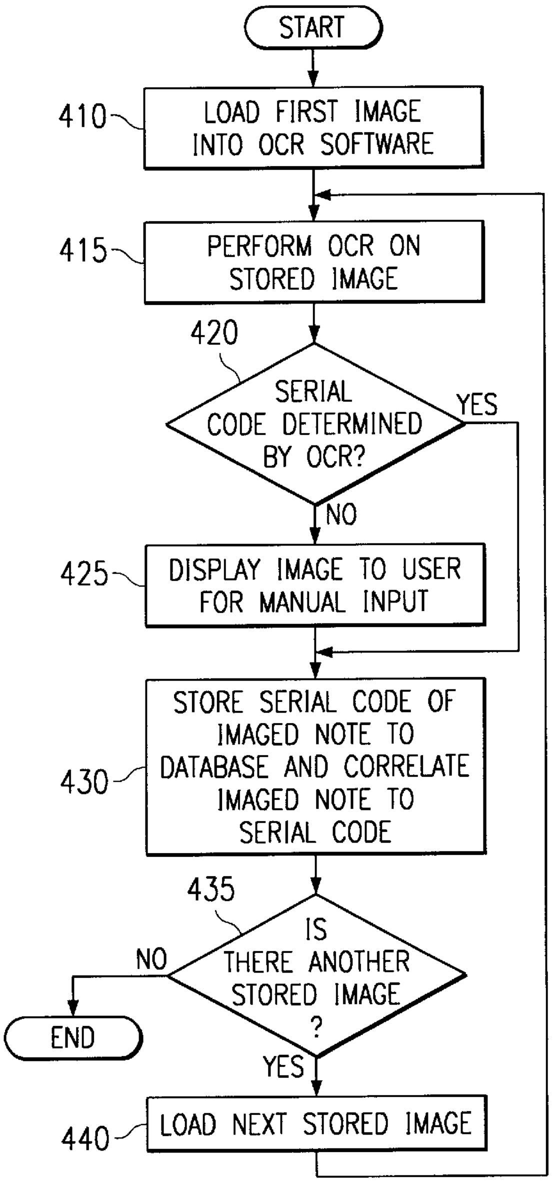
FIG. 4 depicts a flowchart illustrating a preferred method for determining the serial codes of destroyed notes whose images have been captured and stored.
Figure 5:
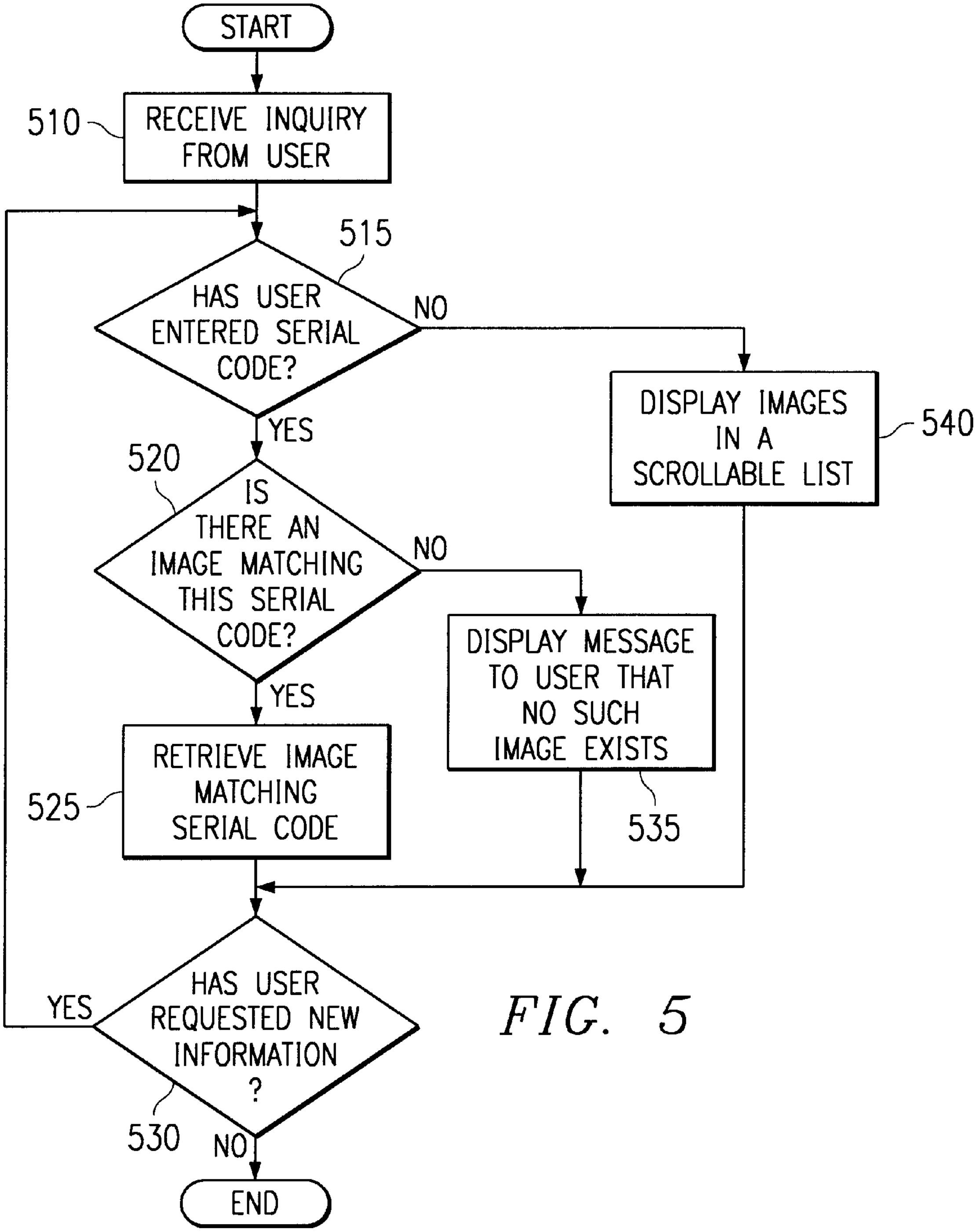
FIG. 5 depicts a flowchart for retrieving images of notes whose images have been captured and stored.

With reference now to FIGS. 3–5, there are shown flowcharts which will aid in understanding the processes of capturing the images of the notes, determining the serial code for each note, and retrieving the images from a database. Turning now to FIG. 3, there is shown a flowchart illustrating a preferred method for capturing and storing an image of a note immediately before the note is shredded by a shredding machine. A note is fed 310 into the shredding machine and the system waits to scan 315 the note until the leading edge of the note is proximate to the shredding tines 320. The next step 325 in the process requires a decision to be made. If the leading edge of the note is not proximate to the shredding tines 320, then the system continues to wait 315. However, once the leading edge of the note is proximate to the shredding tines 320, a line-scan camera scans 325 the first rectangular section of the note. As the note is pulled through the shredding tines, the next rectangular section of the note is scanned 330 by the line-scan camera. The next step 340 in the process requires a decision to be made as to whether the end of the note has been scanned. If not, this process of scanning the next section 330 of the note continues. However, the process of scanning the next section 330 ends when all of the note has been scanned 340. The scanned images of each rectangular section of the note are appended 345 together to produce an image of the entire note. This image of the entire note is then stored 350 in a database for later use. Although depicted as scanning the entire note, alternatively, the scanner may scan only the portion of the note encompassing the serial code.

Turning now to FIG. 4, there is shown a flowchart illustrating a preferred method for determining the serial codes of destroyed notes whose images have been captured and stored. The image of the first note stored is loaded 410 into the optical character recognition (OCR) software and OCR is performed 415 on the image. In the next step 420 of the process, the system must determine whether the serial code was determined by OCR. If the OCR software was unable to determine the entire serial code of the imaged note 420, then the image of that note is displayed 425 to a user and the user manually enters the serial note into the system based on the observed image. Once the serial code of the imaged note has been determined, either by OCR or manually, the serial code is stored 430 into a database. The image is also correlated 430 to the serial code such that the image may be retrieved merely by referencing the serial code of the note. If an image of another note that has not had OCR performed on it exists 435, then the next stored image is loaded 440 and the process repeated starting with performing OCR 415 on this next note. If there are no more notes whose serial codes have not been determined 435, then the process ends.

With reference now to FIG. 5, there is shown a flowchart for retrieving images of notes whose images have been captured and stored and which have been correlated with their respective serial code. The process starts when the system receives an inquiry 510 concerning one or more scanned notes from a user. The next step 515 in the process is a decision step that determines whether the user has entered a serial code. If the user has entered a serial code 515 then the next step 520 in the process determines whether there is an image of a note corresponding to the serial code entered. If the serial code has a corresponding image of a note, then the corresponding note image is retrieved and displayed 525 to the user. The next step 530 in the process then determines whether the user has requested new information related to the database of stored note images. If yes, then the process repeats anew at step 515. If no, then the process ends.

If there is no note image corresponding to the serial code entered by the user, as determined in step 520, then a message is displayed 535 to the user indicating that no note image for the serial code entered exists. The next step 530 in the process then determines whether the user has requested new information concerning the database of imaged notes and, if so, repeats the process starting in step 515, and, if not, the process ends.

After receiving an inquiry 510 from the user and determining that a serial code has not been entered by the user 515, then the note images of the entire database are presented 540 to the user in a scrollable list. The images may be presented to the user, for example, in groups of three where the list may be scrolled through using the up and down arrows on a key board. These images may also be selected by a user such that a larger image of the note selected is displayed to the user. Once the user has completed viewing the list, the next step 530 in the process determines whether new information is requested. If new information is requested 530, then the process repeats as before in step 515; if no information is requested, then the process ends.

By scanning the notes just as they are being destroyed, an accurate database of destroyed notes may be maintained. Comparison between the serial codes determined from the scanned images may be compared against serial codes of notes that were to be destroyed may be made for greater security. Furthermore, if the serial codes of notes that need to be destroyed based on age, soiled condition, or some other factor is known before hand, then an accurate determination of how many and which of these notes have actually been destroyed and which notes have been taken can be made. This is useful to prevent operators of the shredding machine, and others with access to the currency to be destroyed, from taking notes after they have been scanned but before they have been destroyed thereby insuring that unauthorized notes do not remain in or reenter circulation.

Figure 6:
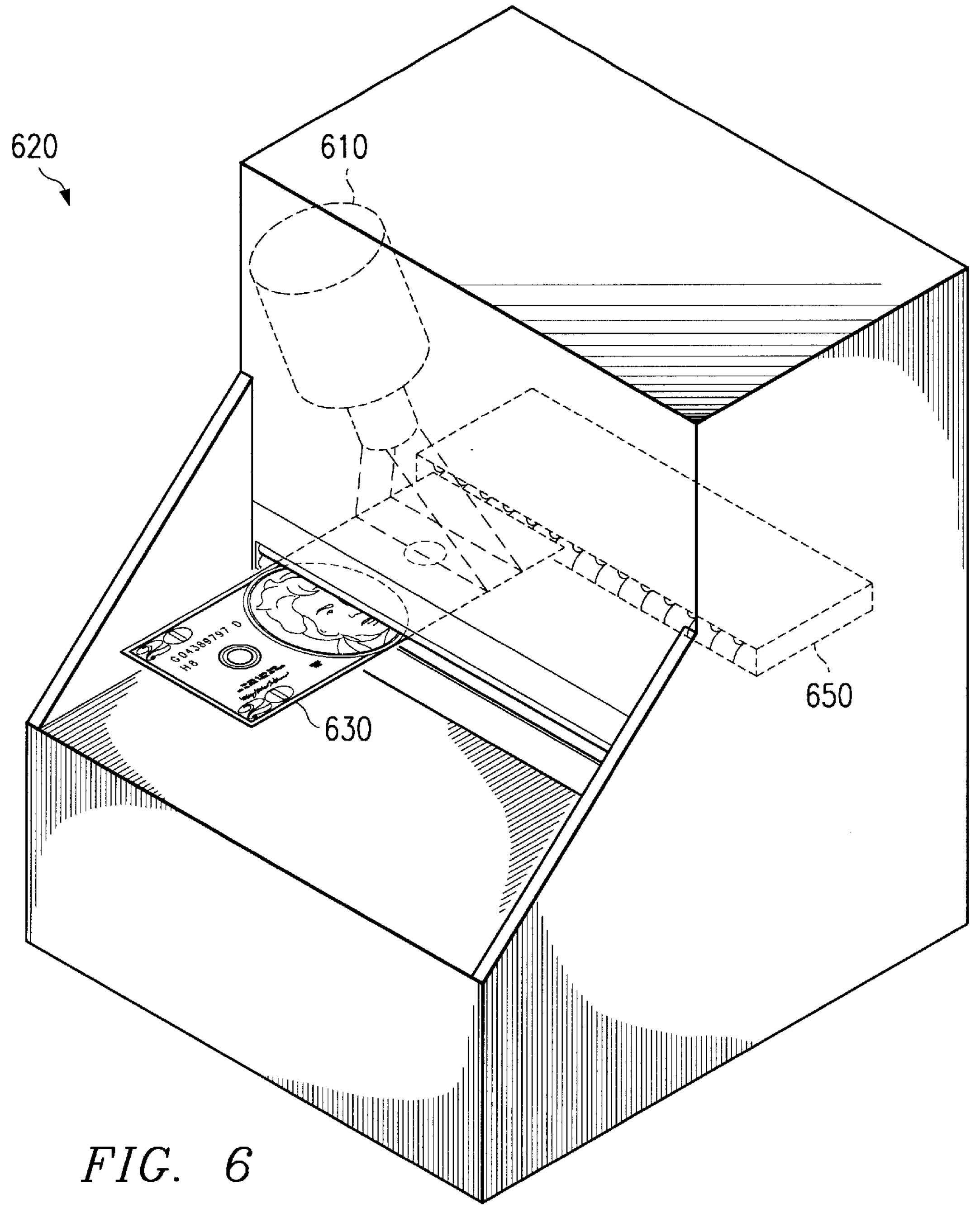
FIG. 6 depicts a note destruction machine in which both the camera and the tines are situated inside the note destruction machine in a user inaccessible location.

In alternative embodiments, the tines or other mechanism for destroying notes are located inside a note destruction machine in a user inaccessible location. In these embodiments, the camera that images the notes may be placed in one of two locations. In one embodiment, as illustrated in FIG. 6, the camera 610 is also situated inside the note destruction machine 620 in a user inaccessible location such that it captures the image of the note 630 prior to the tines 650. Furthermore, since the camera captures the image of the note in a user inaccessible location, the note 630 cannot be removed after the image has been captured but prior to destruction. In this embodiment, the positioning of the camera 610 relative to the note destruction mechanism, such as the tines 650, is not critical. The only requirement is that both the note destruction mechanism, such as the tines 650, and the camera 610 must be located in a user inaccessible location such that the note 630 is never in a user accessible location between the point where its image is captured by the camera and the point where it is destroyed.

Figure 7:
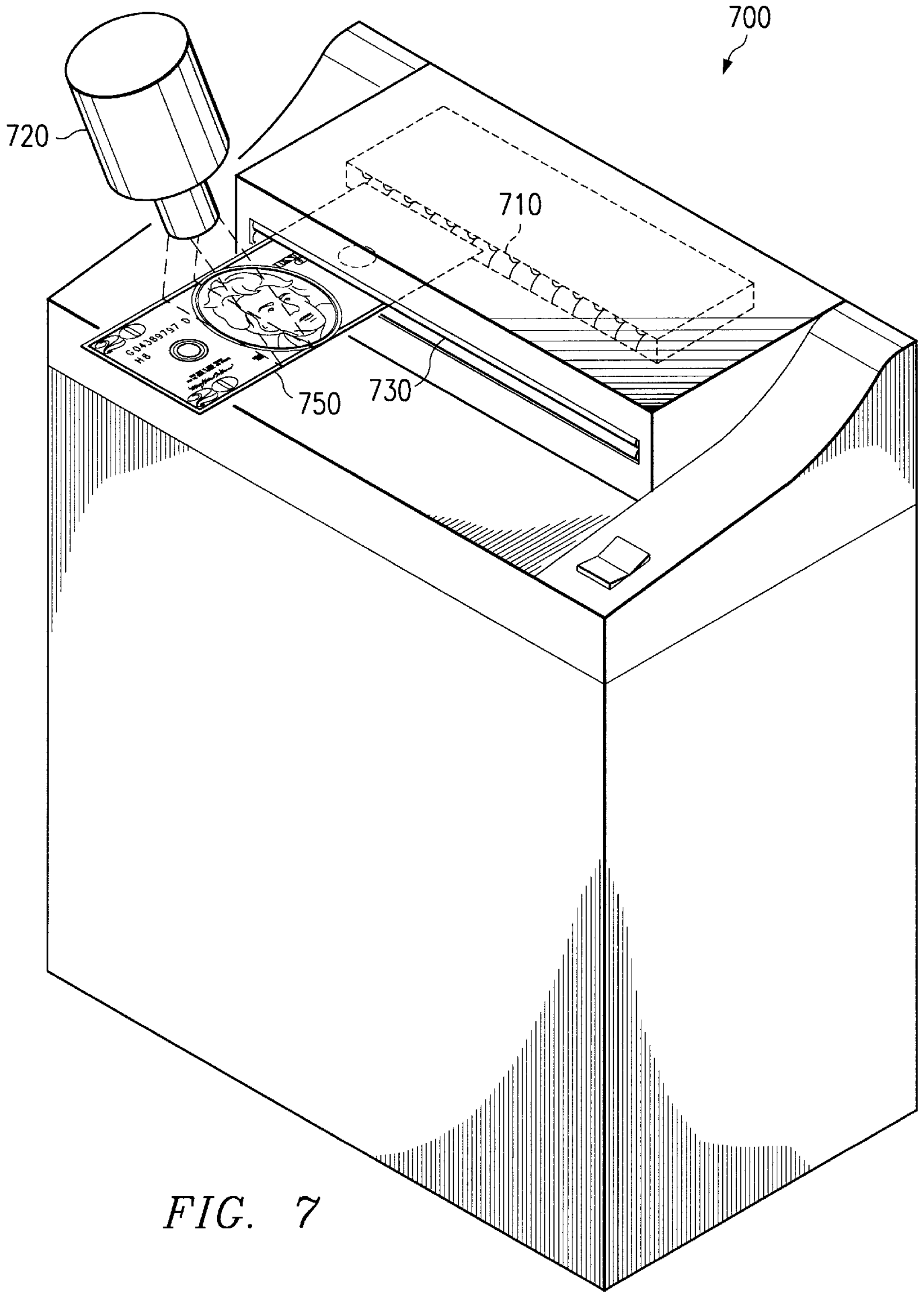
FIG. 7 depicts a note destruction machine in which the tines, but not the camera, are located within the note destruction machine at a user inaccessible location.

In another embodiment, as illustrated in FIG. 7, the tines 710, or other note destruction mechanism, is located within the note destruction machine 700 at a user inaccessible location. However, rather than situate the camera 720 inside the user inaccessible location as in the previously described embodiment, the camera 720 is placed in a user accessible location as in the preferred embodiment. In this case, rollers 730, or other mechanisms, grab the note 750 and pull or otherwise guide the note into the note destruction machine 700 and toward the tines 710. The camera 720 is situated such that the image of the note 750 is captured at a point immediately before the note 750 is grabbed by the rollers 730. Thus, the image is captured at a point where it is difficult or impossible for an operator or other person to remove the note prior to entry into the note destruction machine 700, but following imaging by the camera 710. Preferably, the camera in this embodiment is a line-scan camera as discussed previously.

Typically, central banks and/or government agencies charged with managing a countries currency supply do not allow commercial banks and other financial institutions to destroy worn out currency. One reason for this is because the central banks and/or government agencies have no trustworthy way to verify that specific notes were in fact destroyed rather than stolen or embezzled. The present invention allows the central banks and/or government agencies to receive, in real time, transmissions from the commercial banks where the notes are being destroyed. These transmissions contain the images of the note (or portion of the note) which allow the note to be uniquely identified. Since the images are captured immediately before the note is captured and destroyed by the tines (or other note destruction mechanism) of the note destruction machine, the central banks and/or government agencies can be assured that the notes for which they receive images have actually been destroyed. Once the central banks and/or government agencies have received the images, OCR can be performed on the images at the central banks' and/or government agencies' monitoring station to determine the identity of the destroyed notes. If for any reason OCR cannot identify the distinguishing characteristic of the note, the image of that note can be displayed to a user who can then manually enter the serial code or other distinguishing characteristic into the computer or audit book.

Although, the invention has been primarily described with reference to a shredder, it should be noted that other note destruction means are also applicable. For example, although the note destruction means may be a shredder, it may also be a granulator, an incinerator, or encompass chemical destruction methods as well.

The present invention has application to areas other than destroying notes in which it is necessary to accurately determine that currency notes or other documents have actually been processed into or out of a machine. Using the invention, the unauthorized removal of these notes and/or documents prior to processing or dispensing is prevented and an accurate accounting of the processing or dispensing event is monitored.

An example of such other use is in the context of Automated Teller Machines (ATMs). Most, if not all, ATMs provide for withdrawals of currency from an account holder's account. By capturing the image of the currency notes as they are being pulled out of the ATM by rollers or other note feeder mechanisms for withdrawals, the serial codes and denominations of the notes being withdrawn can be determined. Furthermore, a person withdrawing currency from the ATM is unable to successfully claim that not all of the currency requested was actually delivered to them for withdrawal. Therefore, a person withdrawing currency is unable to defraud the financial institution.

While the invention has been particularly shown and described with reference to a preferred embodiment, it will be understood by those skilled in the art that various changes in form and detail may be made therein without departing from the spirit and scope of the invention.

What is claimed is:

1. An apparatus for performing a pre-destruction note audit, comprising:

a shredding machine comprising shredding tines; and an image capturing device located proximate to the shredding tines such that an image of at least a portion of a note may be captured prior to said portion entering the shredding tines.

2. The apparatus as recited in claim 1, further comprising a data storage device for storing images of the notes captured by said image capturing device.

3. The apparatus as recited in claim 2, further comprising optical character recognition software for determining the serial code of the note based on the image of the note retrieved from the data storage device.

4. The apparatus as recited in claim 2, further comprising a display for displaying the image of the note to a user.

5. The apparatus as recited in claim 1, wherein said image capturing device is a camera.

6. The apparatus as recited in claim 1, wherein said image capturing device is a line-scan camera.

7. The apparatus as recited in claim 1, wherein said image capturing device is located such that each section of the image of the note is recorded as said section is within 5 millimeters from the shredding tines.

8. The apparatus as recited in claim 1, wherein the camera is located such that the image of a serial code cannot be obtained unless a first end of the note has been engaged by the shredding tines.

9. The apparatus as recited in claim 1, wherein the image of said portion is transmitted, in real time, to a monitoring station.

10. A method of performing a pre-destruction image audit, comprising the steps of:

(a) recording an image of a note wherein the image is determined as a first end of the note enters a destruction unit; and (b) destroying the note.

11. The method as recited in claim 10, further comprising the step of determining the serial code of the note.

12. The method as recited in claim 10, wherein the serial code is determined using optical character recognition technology.

13. The method as recited in claim 10, further comprising displaying the image of the note to a user.

14. The method as recited in claim 10, wherein the image of the note is determined using a line-scan camera.

15. The method as recited in claim 10, wherein the image is recorded in gray scale.

16. The method as recited in claim 10, wherein the image is recorded in full color.

17. A currency processing machine, comprising:

an image capturing device for capturing an image of at least a portion of a note containing a unique identifying feature, wherein the unique identifying feature is specific to the note; and a note feeder for feeding notes into the currency processing machine;

wherein the image capturing device is positioned such that it captures the image of at least a portion of the note proximate to the note feeder.

18. The currency processing machine as recited in claim 17, wherein the image capturing device is a camera.

19. The currency processing machine as recited in claim 18, wherein the camera is a line-scan camera.

20. The currency processing machine as recited in claim 17, wherein the image of the portion of the note is transmitted, in real time, to a monitoring station.

21. A currency processing machine, comprising:

an image capturing device for capturing an image of at least a portion of a note;

a note feeder for feeding notes into the currency processing machine; and a note destruction device located in a user inaccessible location within the currency processing machine;

wherein the image capturing device is positioned such that it captures the image of at least a portion of the note proximate to the note feeder.

22. The currency processing machine as recited in claim 21, wherein the note destruction device is a shredder.

23. A currency processing machine, comprising:

an image capturing device for capturing an image of at least a portion of a note;

a note feeder for feeding notes into the currency processing machine; and an optical character recognition system for determining a serial code from the captured image of the note;

wherein the image capturing device is positioned such that it captures the image of at least a portion of the note proximate to the note feeder.

24. A note destruction machine, comprising:

an image capturing device situated inside a user inaccessible location within the note destruction machine for capturing the image of at least a portion of individual notes; and a note destruction means situated inside the user inaccessible location within the note destruction machine.

25. The note destruction machine as recited in claim 24, wherein the note destruction means is a shredder.

26. The note destruction machine as recited in claim 24, wherein the camera is a line-scan camera.

27. The note destruction machine as recited in claim 24, wherein the image of the portion of the note is transmitted, in real time, to a monitoring station.

28. An automated teller machine, comprising:

an image capturing device to capture the image of at least a portion of a currency note containing a unique identifying feature, wherein the unique identifying feature is specific to the note; and a note feeder;

wherein the image capturing device is positioned such that the image of the currency note is captured as it enters the note feeder.

29. The automated teller machine as recited in claim 28, wherein the image capturing device is a camera.

30. The automated teller machine as recited in claim 28, wherein the image of the portion of the note is transmitted, in real time, to a monitoring station.

31. An automated teller machine, comprising:

an image capturing device to capture the image of at least a portion of a currency note;

a note feeder; and an optical character recognition system for determining the serial code of a currency note dispensed through the automated teller machine;

wherein the image capturing device is positioned such that the image of the currency note is captured as it enters the note feeder.

32. An automated teller machine, comprising:

an image capturing device to capture the image of at least a portion of a currency note;

a note feeder; and an optical character recognition system for determining the serial code of a currency note received through the automated teller machine;

wherein the image capturing device is positioned such that the image of the currency note is captured as it enters the note feeder.

33. A method of auditing note processing, comprising the steps of:

determining unique identifying features of notes to be processed prior to placement in a currency processing machine, wherein at least some of the unique identifying features are specific to an individual note;

recording, in a currency processing machine, the image of at least a portion of each of the notes, wherein the image is determined as a first end of the note enters a processing stage;

determining, from the image, the identifying feature of each of the notes; and comparing the identifying feature of each of the notes as determined prior to placement in the currency processing machine with that as determined from the image to determine which of the notes have been processed.

34. The method as recited in claim 33, wherein the image is transferred, in real time, to a monitoring station and wherein the monitoring station compares the identifying feature as determined from the image to the identifying feature as determined prior to placement of the notes in the currency processing machine.

35. The method as recited in claim 33, wherein the currency processing machine is an automated teller machine and the processing stage is a dispensing of one of the notes from the automated teller machine.

36. The method as recited in claim 35, wherein the processing stage is a stage after a first part of the notes have been disengaged from a note feeder.

37. The method as recited in claim 36, wherein the note feeder comprises rollers.

38. A method of auditing note processing, comprising the steps of:

determining a identifying features of notes to be processed prior to placement in a currency processing machine;

recording, in a currency processing machine, the image of at least a portion of each of the notes, wherein the image is determined as a first end of the note enters a processing stage;

determining, from the image, the identifying feature of each of the notes; and comparing the identifying feature of each of the notes as determined prior to placement in the currency processing machine with that as determined from the image to determine which of the notes have been processed;

wherein the identifying feature is a serial code.

39. A method of auditing note processing, comprising the steps of:

determining a identifying features of notes to be processed prior to placement in a currency processing machine;

recording, in a currency processing machine, the image of at least a portion of each of the notes, wherein the image is determined as a first end of the note enters a processing stage;

determining, from the image, the identifying feature of each of the notes; and comparing the identifying feature of each of the notes as determined prior to placement in the currency processing machine with that as determined from the image to determine which of the notes have been processed;

wherein the currency processing machine is a note destroying machine and the processing stage is a note destruction apparatus.

40. The method as recited in claim 39, wherein the note destruction apparatus comprises a shredder.

41. A currency processing machine, comprising:

an image capturing device to capture the image of at least a portion of a currency note containing a unique identifying feature, wherein the unique identifying feature is specific to the currency note; and a note feeder;

wherein the image capturing device is positioned such that the image of the currency note is captured as it exits the note feeder.

42. The currency processing machine as recited in claim 41, wherein the image capturing device is a camera.

43. The currency processing machine as recited in claim 42, wherein the camera is a line-scan camera.

44. The currency processing machine as recited in claim 41, wherein the image of the portion of the note is transmitted, in real time, to a monitoring station.

45. A currency processing machine, comprising:

an image capturing device to capture the image of at least a portion of a currency note;

a note feeder; and an optical character recognition system for determining the serial code of a currency note dispensed through the automated teller machine;

wherein the image capturing device is positioned such that the image of the currency note is captured as it exits the note feeder.

46. A currency processing machine, comprising:

an image capturing device to capture the image of at least a portion of a currency note;

a note feeder; and an optical character recognition system for determining the serial code of a currency note received through the automated teller machine;

wherein the image capturing device is positioned such that the image of the currency note is captured as it exits the note feeder.

47. A currency processing machine, comprising:

an image capturing device to capture the image of at least a portion of a currency note; and a note feeder;

wherein the image capturing device is positioned such that the image of the currency note is captured as it exits the note feeder; and wherein the currency processing machine is an automated teller machine for dispensing currency to users.

* * * * *

UNITED STATES PATENT AND TRADEMARK OFFICE

CERTIFICATE OF CORRECTION

PATENT NO. : 6,351,552 B1
DATED : February 26, 2002
INVENTOR(S) : Weaver et al.

It is certified that error appears in the above-identified patent and that said Letters Patent is hereby corrected as shown below:

Title page,
Please change the name of the Assignee to the following:

[73] Currency Systems International, Inc.
6401 Commerce Drive
Irving, Texas 75063
US Signed and Sealed this Seventeenth Day of September, 2002

*Attest:*

JAMES E. ROGAN

*Attesting Officer*

*Director of the United States Patent and Trademark Office*